United States Patent
Hirasawa (10) Patent No.: US 8,247,920 B2
(45) Date of Patent: Aug. 21, 2012

(54) POWER SUPPLY CONTROL DEVICE, METHOD FOR CONTROLLING POWER SUPPLY DEVICE, AND COMPUTER-READABLE STORAGE MEDIUM STORING PROGRAM FOR CAUSING COMPUTER TO PERFORM METHOD FOR CONTROLLING POWER SUPPLY DEVICE

(75) Inventor: Takahiko Hirasawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 443 days.

(21) Appl. No.: 12/450,346

(22) PCT Filed: Mar. 27, 2008

(86) PCT No.: PCT/JP2008/056656
§ 371 (c)(1),
(2), (4) Date: Sep. 22, 2009

(87) PCT Pub. No.: WO2008/132949
PCT Pub. Date: Nov. 6, 2008

(65) Prior Publication Data
US 2010/0045104 A1    Feb. 25, 2010

(30) Foreign Application Priority Data
Apr. 25, 2007  (JP) .................................. 2007-115895

(51) Int. Cl.
*B60L 1/00* (2006.01)
*B60L 3/00* (2006.01)
*H01H 47/00* (2006.01)

(52) U.S. Cl. .................. 307/9.1; 307/132 EA; 307/134; 307/137

(58) Field of Classification Search ................... 307/9.1, 307/132 EA, 134, 137
See application file for complete search history.

(56) References Cited

U.S. PATENT DOCUMENTS

| | | | |
|---|---|---|---|
| 6,657,833 B2 * | 12/2003 | Matsuki et al. | 361/23 |
| 7,368,829 B2 * | 5/2008 | Tezuka | 307/9.1 |
| 2006/0137929 A1 | 6/2006 | Yoshida | |

FOREIGN PATENT DOCUMENTS

| | | |
|---|---|---|
| JP | A 10-191639 | 7/1998 |
| JP | A 11-308704 | 11/1999 |
| JP | A 2005-143259 | 6/2005 |
| JP | A 2005-295697 | 10/2005 |
| JP | A 2006-109603 | 4/2006 |
| JP | A 2006-182300 | 7/2006 |
| JP | A 2006-320079 | 11/2006 |
| WO | WO 2006/121144 A1 | 11/2006 |

* cited by examiner

*Primary Examiner* — Hal Kaplan
(74) *Attorney, Agent, or Firm* — Oliff & Berridge, PLC (57) ABSTRACT

A motor drive device includes first to third system main relays, a limiting resistor, and a control device. Upon start of the motor drive device, the control device determines whether or not the first and third system main relays are welded, based on voltage VH. If the control device determines that the first and third system main relays are both welded, then it prohibits a discharging process, which is to discharge a capacitor using motor generators.

9 Claims, 7 Drawing Sheets

POWER SUPPLY CONTROL DEVICE, METHOD FOR CONTROLLING POWER SUPPLY DEVICE, AND COMPUTER-READABLE STORAGE MEDIUM STORING PROGRAM FOR CAUSING COMPUTER TO PERFORM METHOD FOR CONTROLLING POWER SUPPLY DEVICE

TECHNICAL FIELD

The present invention relates to a power supply control device having a limiting resistor that prevents inrush current when powering on a system main relay, a method for controlling a power supply device having such a limiting resistor, and a computer-readable storage medium storing a program for causing a computer to perform the control method.

BACKGROUND ART

Japanese Patent Laying-Open No. 2005-143259 discloses a load driving device capable of discharging residual electric charge in a capacitor provided in the input side of an inverter. The load driving device includes the capacitor provided in the input side of the inverter for driving an alternating-current motor; a discharging resistor connected to the capacitor in parallel; a boost converter converting voltage between a battery and the capacitor; an electric path connecting a high voltage side of the boost converter to the positive electrode side of the battery; a system relay opening and closing the electric path; and a limiting resistor provided at the electric path in series with the system relay.

In the load driving device, when an ignition key is turned off, electric power accumulated in the capacitor is brought back to the battery via the limiting resistor and the system relay. When voltage across the capacitor decreases, the residual electric charge in the capacitor is discharged by the discharging resistor and the alternating-current motor.

However, Japanese Patent Laying-Open No. 2005-143259 discloses no process in the case where the system relay is welded. If the system relay provided at the electric path is welded and the discharging resistor and the alternating-current motor repeatedly perform the process of discharging the capacitor, the limiting resistor may be heated excessively and be broken.

DISCLOSURE OF THE INVENTION

The present invention is made to solve the foregoing problem, and its object is to provide a power supply control device capable of preventing a limiting resistor from being excessively heated.

Another object of the present invention is to provide a method for controlling the power supply device capable of preventing the limiting resistor from being excessively heated, and a computer-readable storage medium storing a program for causing a computer to perform the control method.

According to the present invention, a power supply control device is mounted on a vehicle, and includes first to third relays, a resistive element, a discharging device, and a control device. The first relay is connected to one electrode of a direct-current power supply. The second relay is connected to the other electrode of the direct-current power supply. The third relay and the resistive element are connected in series and are connected to the second relay in parallel. The discharging device is configured to be able to discharge a charge unit connected between a first power line electrically connected to the first relay and a second power line electrically connected to a circuit including the second relay as well as the third relay and the resistive element connected in series. The control device prohibits the discharging device from discharging the charge unit if the first and third relays are determined to be welded.

It is preferable that the control device output a command to the discharging device to instruct discharging of the charge unit if the charge unit has a voltage exceeding a first predetermined value after start of a system of the vehicle, and the control device determine that the first and third relays are welded if the voltage exceeds a second predetermined value thereafter.

It is preferable that the control device also prohibit the discharging device from discharging the charge unit if collision of the vehicle is detected.

Further, according to the present invention, a method for controlling a power supply control device is to control a power supply device mounted on a vehicle. The power supply device includes a direct-current power supply, first to third relays, a resistive element, and a discharging device. The first relay is connected to one electrode of the direct-current power supply. The second relay is connected to the other electrode of the direct-current power supply. The third relay and the resistive element are connected in series and are connected to the second relay in parallel. The discharging device is configured to be able to discharge a charge unit connected between a first power line electrically connected to the first relay and a second power line electrically connected to a circuit including the second relay as well as the third relay and the resistive element connected in series. The method includes the steps of: determining whether or not the first and third relays are welded; and prohibiting the discharging device from discharging the charge unit if the first and third relays are determined to be welded.

It is preferable that the step of determining include the steps of: instructing discharging of the charge unit if the charge unit has a voltage exceeding a first predetermined value after start of a system of the vehicle; and determining that the first and third relays are welded, if the voltage exceeds a second predetermined value even after instructing the discharging.

It is preferable that the method further include the step of determining whether or not collision of the vehicle is detected. If the collision of the vehicle is detected, the discharging device is prohibited from discharging the charge unit in the step of prohibiting.

Furthermore, according to the present invention, a storage medium, which is a computer-readable storage medium, stores a program for causing a computer to execute any one of the above-described methods for controlling a power supply device.

In the present invention, the third relay and the resistive element are provided to prevent inrush current from flowing from the direct-current power supply to the charge unit. If the discharging device repeatedly discharges the charge unit with the first and third relays being both welded, current would repeatedly flow in the resistive element to excessively heat the resistive element. However, in the present invention, when it is determined that the first and third relays are welded, the discharging device is prohibited from discharging the charge unit. Thus, according to the present invention, the resistive element can be prevented from being heated excessively.

BEST MODES FOR CARRYING OUT THE INVENTION

Embodiments of the present invention will be described in detail below with reference to figures. It should be noted that the same or equivalent portions in the figures are given the same reference characters, and explanation therefor will not be repeated.

First Embodiment

Figure 1:
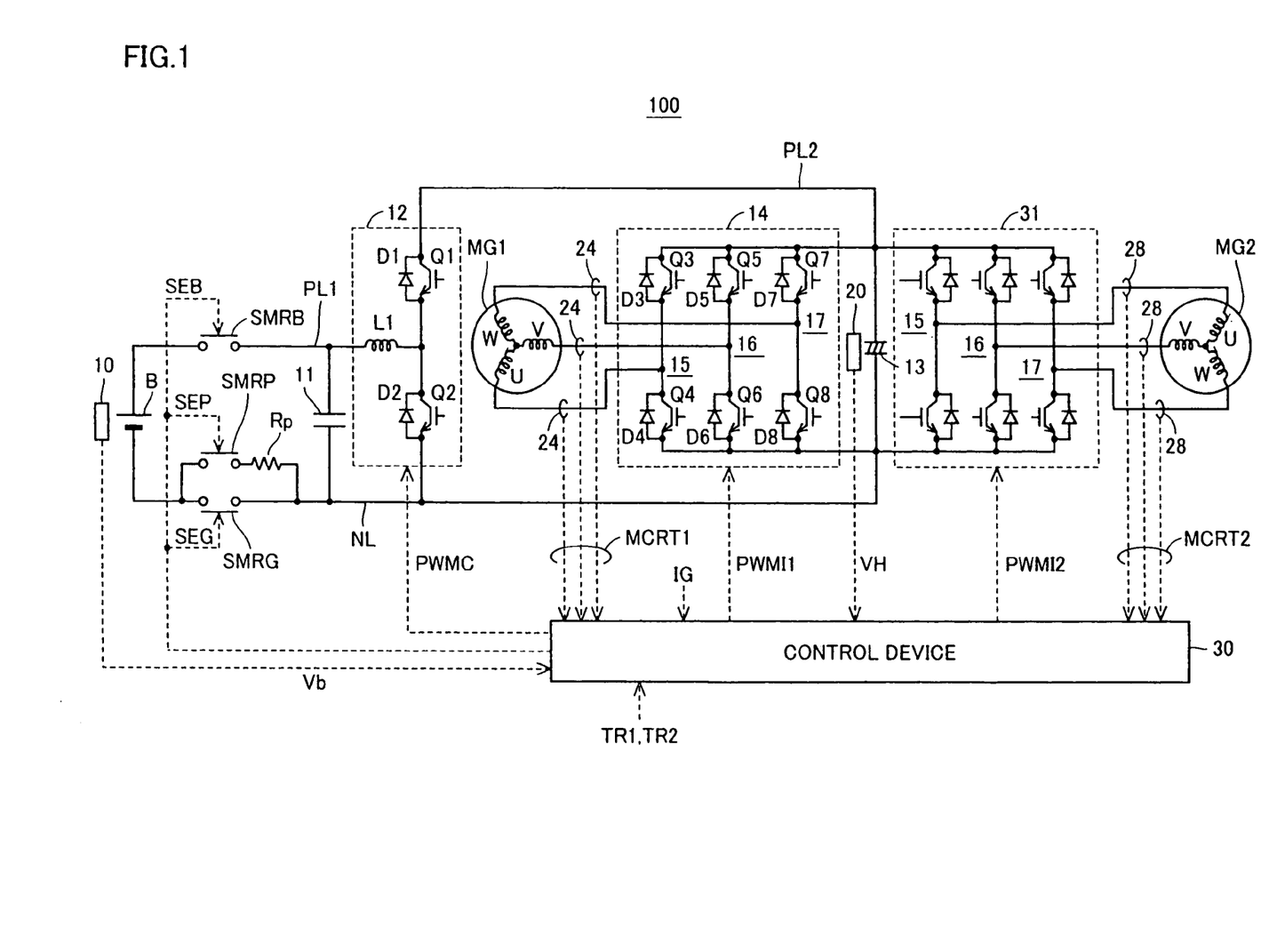
FIG. 1 is a schematic block diagram of a motor drive device including a power supply control device according to a first embodiment of the present invention.

FIG. 1 is a schematic block diagram of a motor drive device including a power supply control device according to a first embodiment of the present invention. Referring to FIG. 1, motor drive device 100 includes a direct-current power supply B, voltage sensors 10, 20, system main relays SMRB, SMRG, SMRP, a limiting resistor Rp, capacitors 11, 13, a boost converter 12, inverters 14, 31, current sensors 24, 28, and a control device 30.

Motor drive device 100 is mounted on, for example, a hybrid vehicle. Motor drive device 100 drives a motor generator MG1 connected to an engine (not shown) of the hybrid vehicle. Motor generator MG1 serves as an electric power generator that generates electric power using motive power of the engine and also serves as a motor capable of starting the engine.

Motor drive device 100 also drives a motor generator MG2 to generate torque for driving a driving wheel of the hybrid vehicle. In addition, upon braking of the vehicle, motor generator MG2 receives torque from the driving wheel to generate regenerative electric power, and generates braking torque with the generation of the regenerative electric power.

System main relay SMRB is connected between the positive electrode of direct-current power supply B and a positive electrode line PL1. System main relay SMRG is connected between the negative electrode of direct-current power supply B and a negative electrode line NL. System main relay SMRP and limiting resistor Rp are connected in series. System main relay SMRP and limiting resistor Rp thus connected in series are connected to system main relay SMRG in parallel.

Boost converter 12 includes a reactor L1, switching elements Q1, Q2, and diodes D1, D2. Switching elements Q1, Q2 are connected between a positive electrode line PL2 and negative electrode line NL in series. Diodes D1, D2 are connected respectively to switching elements Q1, Q2 in anti-parallel. Reactor L1 has one end connected to positive electrode line PL1, and has the other end connected to the connection node of switching elements Q1, Q2. As each of switching elements Q1, Q2, an IGBT (Insulated Gate Bipolar Transistor), a power MOSFET (Metal Oxide Semiconductor Field-Effect Transistor), or the like can be used, for example.

Inverter 14 includes a U-phase arm 15, a V-phase arm 16, and a W-phase arm 17. U-phase arm 15, V-phase arm 16, and W-phase arm 17 are connected between positive electrode line PL2 and negative electrode line NL in parallel. U-phase arm 15 is constituted by switching elements Q3, Q4 connected in series. V-phase arm 16 is constituted by switching elements Q5, Q6 connected in series. W-phase arm 17 is constituted by switching elements Q7, Q8 connected in series. Diodes D3-D8 are connected respectively to switching elements Q3-Q8 in anti-parallel. Intermediate points in the phase arms are connected to the corresponding phase coils of generator MG1 respectively. As each of switching elements Q3-Q8, an IGBT, a power MOSFET, or the like can be used too, for example. Inverter 31 has a configuration similar to that of inverter 14.

Direct-current power supply B is a chargeable secondary battery, and is constituted by, for example, a secondary battery such as a nickel hydrogen battery or a lithium ion battery. As direct-current power supply B, a capacitor having a large capacitance may be used instead of the secondary battery. Voltage sensor 10 detects voltage Vb of direct-current power supply B and outputs the detected value thereof to control device 30.

System main relays SMRB, SMRG, SMRP are turned on/off in response to signals SEB, SEG, SEP from control device 30, respectively. Specifically, system main relays SMRB, SMRG, SMRP are turned on when signals SEB, SEG, SEP are activated, and are tuned off when signals SEB, SEG, SEP are deactivated. Capacitor 11 smoothens fluctuations of voltage between positive electrode line PL1 and negative electrode line NL.

Boost converter 12 adjusts, based on a signal PWMC from control device 30, voltage VH between positive electrode line PL2 and negative electrode line NL to a target voltage equal to or greater than voltage Vb of direct-current power supply B. Specifically, when voltage VH is lower than the target voltage, boost converter 12 boosts direct-current voltage from direct-current power supply B based on signal PWMC and lets current flow from positive electrode line PL1 to positive electrode line PL2, thus boosting voltage VH. When voltage VH is higher than the target voltage, based on signal PWMC, boost converter 12 causes current to flow from positive electrode line PL2 to positive electrode line PL1 in order to decrease voltage VH.

Capacitor 13 smoothens fluctuations of voltage between positive electrode line PL2 and negative electrode line NL. Voltage sensor 20 detects voltage VH across capacitor 13 (corresponding to output voltage of boost converter 12 and voltage input to each of inverters 14, 31; the same holds true in the description below), and outputs the detected value thereof to control device 30.

Based on a signal PWMI1 from control device 30, inverter 14 converts the direct-current voltage between positive electrode line PL2 and negative electrode line NL into three-phase alternating-current voltage and outputs it to motor generator MG1 to drive motor generator MG1. Based on signal PWMI1 from control device 30, inverter 14 converts, into direct-current voltage, alternating-current voltage generated by motor generator MG1 using motive power of the engine, and outputs the converted direct-current voltage to positive electrode line PL2 and negative electrode line NL.

Based on a signal PWMI2 from control device 30, inverter 31 converts the direct-current voltage between positive electrode line PL2 and negative electrode line NL into three-phase alternating-current voltage, and outputs it to motor generator MG2 to drive motor generator MG2. In addition, upon the regenerative braking of the vehicle, inverter 31 converts regenerative electric power from motor generator MG2 into direct-current voltage based on signal PWMI2, and outputs it to positive electrode line PL2 and negative electrode line NL.

Current sensor 24 detects motor current MCRT1 flowing in motor generator MG1, and outputs the detected value thereof to control device 30. Current sensor 28 detects motor current MCRT2 flowing in motor generator MG2, and outputs the detected value thereof to control device 30.

When a signal IG indicating start of the vehicular system is activated, control device 30 performs, in accordance with a method described below, a process to determine whether or not system main relays SMRB, SMRP are welded. If control device 30 determines that system main relays SMRB, SMRP are both welded, it prohibits a discharging process, which is to discharge capacitor 13.

For the following reason, the discharging process is prohibited when it is determined that system main relays SMRB, SMRP are both welded. When signal IG is activated, control device 30 determines whether or not voltage VH is equal to or greater than a predetermined value. If control device 30 determines that voltage VH is equal to or greater than the predetermined value, it uses motor generators MG1, MG2 to perform the discharging process to discharge capacitor 13. Specifically, control device 30 controls inverters 14, 31 so that no q-axis current flows in motor generators MG1, MG2, whereby electric charge in capacitor 13 is consumed by motor generators MG1, MG2.

If system main relays SMRB, SMRP are both welded, capacitor 13 is charged from direct-current power supply B via diode D1 of boost converter 12 even though the discharging process is performed to discharge capacitor 13. On this occasion, current flows in limiting resistor Rp. Hence, with system main relays SMRB, SMRP being both welded, current flows in limiting resistor Rp whenever the ignition key is turned off/on. Accordingly, limiting resistor Rp may be excessively heated and broken.

In view of this, in the first embodiment, if it is determined that system main relays SMRB, SMRP are both welded, the discharging process is prohibited in order to prevent limiting resistor Rp from being heated excessively and broken.

On the other hand, if control device 30 determines that system main relays SMRB, SMRP are not welded, it activates signals SEB, SEP to turn on system main relays SMRB, SMRP, SMRG, thus precharging capacitors 11, 13.

After completion of precharging of capacitors 11, 13, control device 30 generates signal PWMI1 based on a torque target value TR1, motor current MCRT1, and a motor rotational position θ1 of motor generator MG1, as well as voltage VH, so as to control switching of switching elements Q3-Q8 of inverter 14 during driving of motor generator MG1, and sends inverter 14 signal PWMI1 thus generated.

Further, control device 30 generates signal PWMI2 based on a torque target value TR2, motor current MCRT2, and a motor rotational position θ2 of motor generator MG2, as well as voltage VH, so as to control switching of the switching elements of inverter 31 during driving of motor generator MG2, and sends inverter 31 signal PWMI2 thus generated.

Further, control device 30 generates signal PWMC to control switching of switching elements Q1, Q2 of boost converter 12, and sends boost converter 12 signal PWMC thus generated.

Furthermore, when signal IG is deactivated, control device 30 uses motor generators MG1, MG2 to discharge capacitors 11, 13, and determines whether or not system main relay SMRG is welded.

Figure 2:
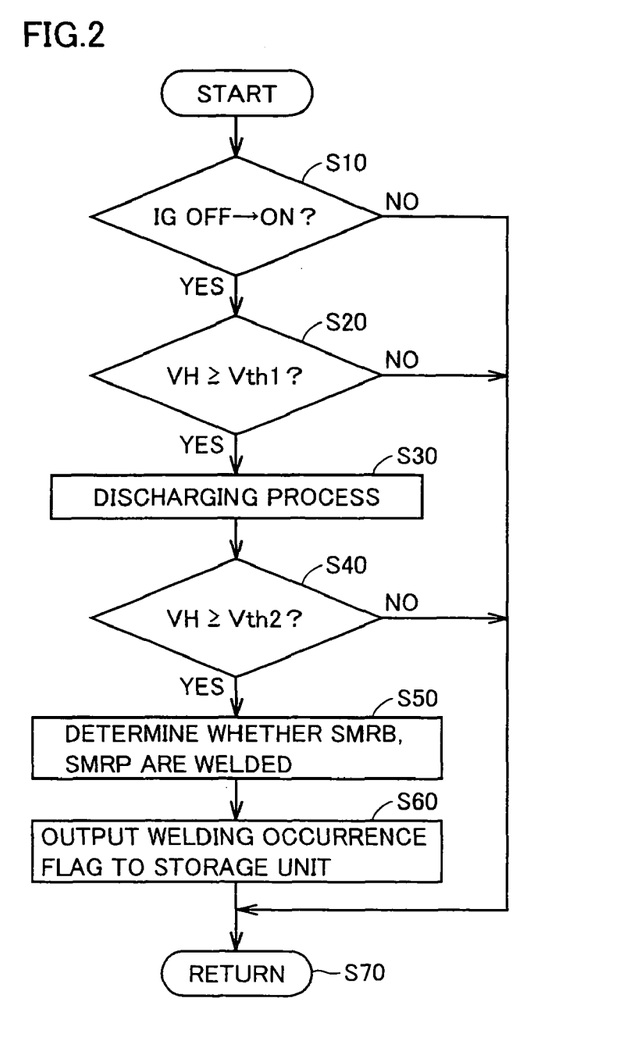
FIG. 2 is a first flowchart illustrating a process performed by the control device shown in FIG. 1 to prohibit a discharging process.
Figure 3:
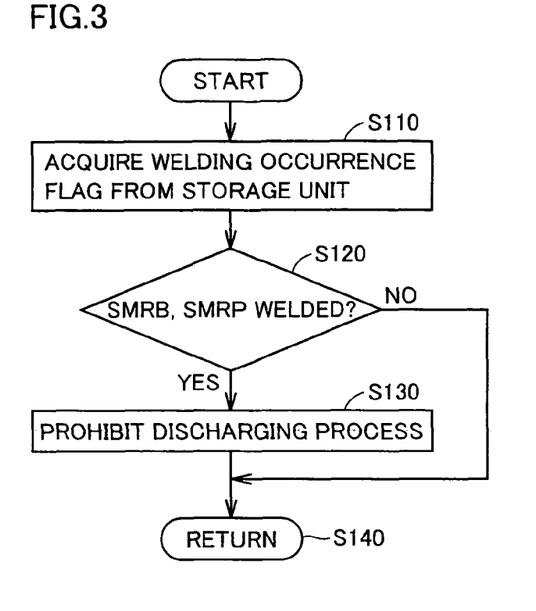
FIG. 3 is a second flowchart illustrating a process performed by the control device shown in FIG. 1 to prohibit the discharging process.

Each of FIGS. 2, 3 is a flowchart illustrating the process performed by control device 30 shown in FIG. 1 to prohibit the discharging process. The process in the flowchart is called from a main routine and executed whenever a fixed period of time passes or a predetermined condition is satisfied.

Referring to FIG. 2, control device 30 determines whether or not signal IG has been changed from a deactivated state to an activated state (step S10). If the change of signal IG is not detected (NO in step S10), control device 30 transfers the process to step S70 to bring the process back to the main routine.

If it is detected in step S10 that signal IG has been changed from the deactivated state to the activated state (YES in step S10), control device 30 determines whether or not voltage VH is equal to or greater than a predetermined value Vth1 (step S20). If voltage VH is lower than predetermined value Vth1, control device 30 transfers the process to step S70.

If it is determined in step S20 that voltage VH is equal to or greater than predetermined value Vth1 (YES in step S20), control device 30 uses motor generators MG1, MG2 to perform the discharging process to discharge capacitor 13 (step S30). Specifically, as described above, inverters 14, 31 are controlled so that no q-axis current flows in motor generators MG1, MG2.

While the discharging process is being performed, control device 30 determines whether or not voltage VH is equal to or greater than a predetermined value Vth2 (step S40). If it is determined that voltage VH is equal to or greater than predetermined value Vth2 (YES in step S40), control device 30 determines that system main relays SMRB, SMRP are both welded because voltage VH does not decrease despite the discharging process performed (step S50). Then, control device 30 generates a welding occurrence flag indicating occurrence of welding, and outputs it to a storage unit (not shown) (step S60).

On the other hand, in step S40, when voltage VH is lower than predetermined value Vth2 (NO in step S40), control device 30 transfers the process to step S70.

Referring to FIG. 3, control device 30 acquires the welding occurrence flag from the storage unit (step S110) and determines whether or not system main relays SMRB, SMRP are both welded (step S120). If control device 30 determines that system main relays SMRB, SMRP are both welded (YES in step S120), it prohibits execution of the subsequent discharging process (step S130). On the other hand, if it is determined in step S120 that system main relays SMRB, SMRP are not welded (NO in step S120), control device 30 transfers the process to step S140 and brings the process back to the main routine.

Figure 4:
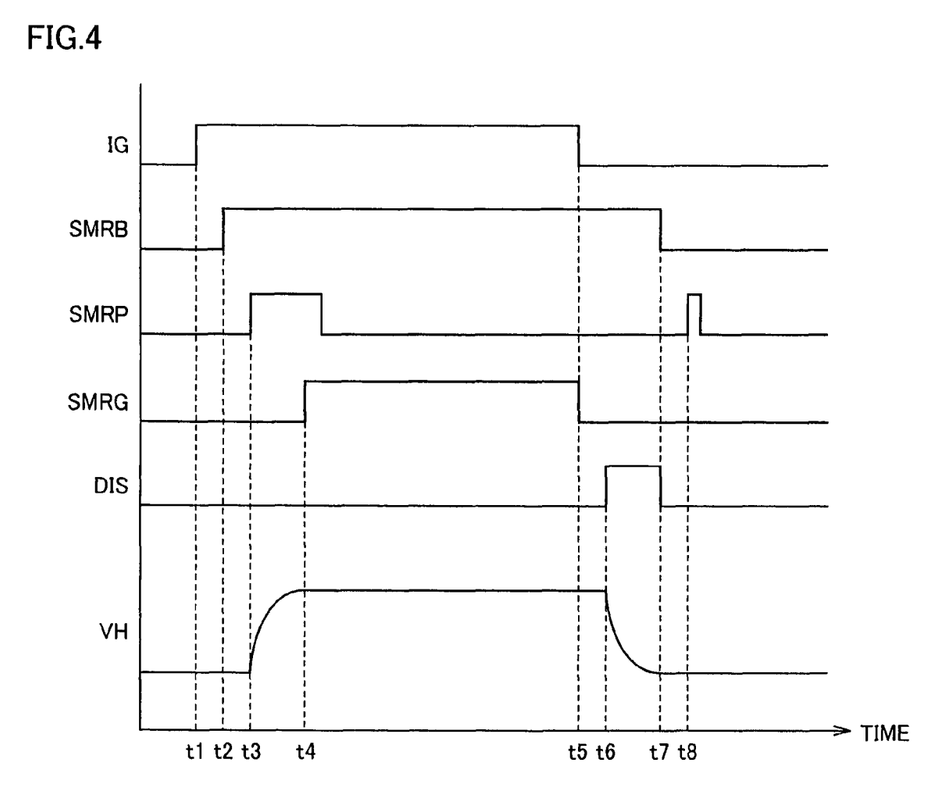
FIG. 4 is a timing chart illustrating operations of a system main relay shown in FIG. 1.

FIG. 4 is a timing chart illustrating the operations of system main relays SMRB, SMRP, SMRG shown in FIG. 1. It should be noted that FIG. 4 shows a timing chart in the case where system main relays SMRB, SMRP, SMRG are not welded.

Referring to FIG. 4, when signal IG is activated at time t1, control device 30 confirms that voltage VH, which represents voltage of capacitor 13, is lower than the predetermined value, turns on system main relay SMRB at time t2, and turns on system main relay SMRP at time t3. Accordingly, capacitors 11, 13 are precharged via limiting resistor Rp, resulting in increase of voltage VH. Then, at time t4, control device 30 turns on system main relay SMRG, and turns off system main relay SMRP at time t5.

When signal IG is deactivated at time t5, control device 30 turns off system main relay SMRG. Note that system main relay SMRP is off. Then, at time t6, control device 30 activates a signal DIS to instruct execution of the discharging process. This causes motor generators MG1, MG2 to discharge capacitor 13, resulting in decrease of voltage VH. If voltage VH does not decrease on this occasion, it is determined that system main relay SMRG is welded.

At time t7, control device 30 deactivates signal DIS and turns off system main relay SMRB. At time t8, system main relay SMRP is turned on for a short period of time to determine whether or not system main relay SMRB is welded. Namely, if voltage VH changes in response to the turning-on of system main relay SMRP, it is determined that system main relay SMRB is welded.

Figure 5:
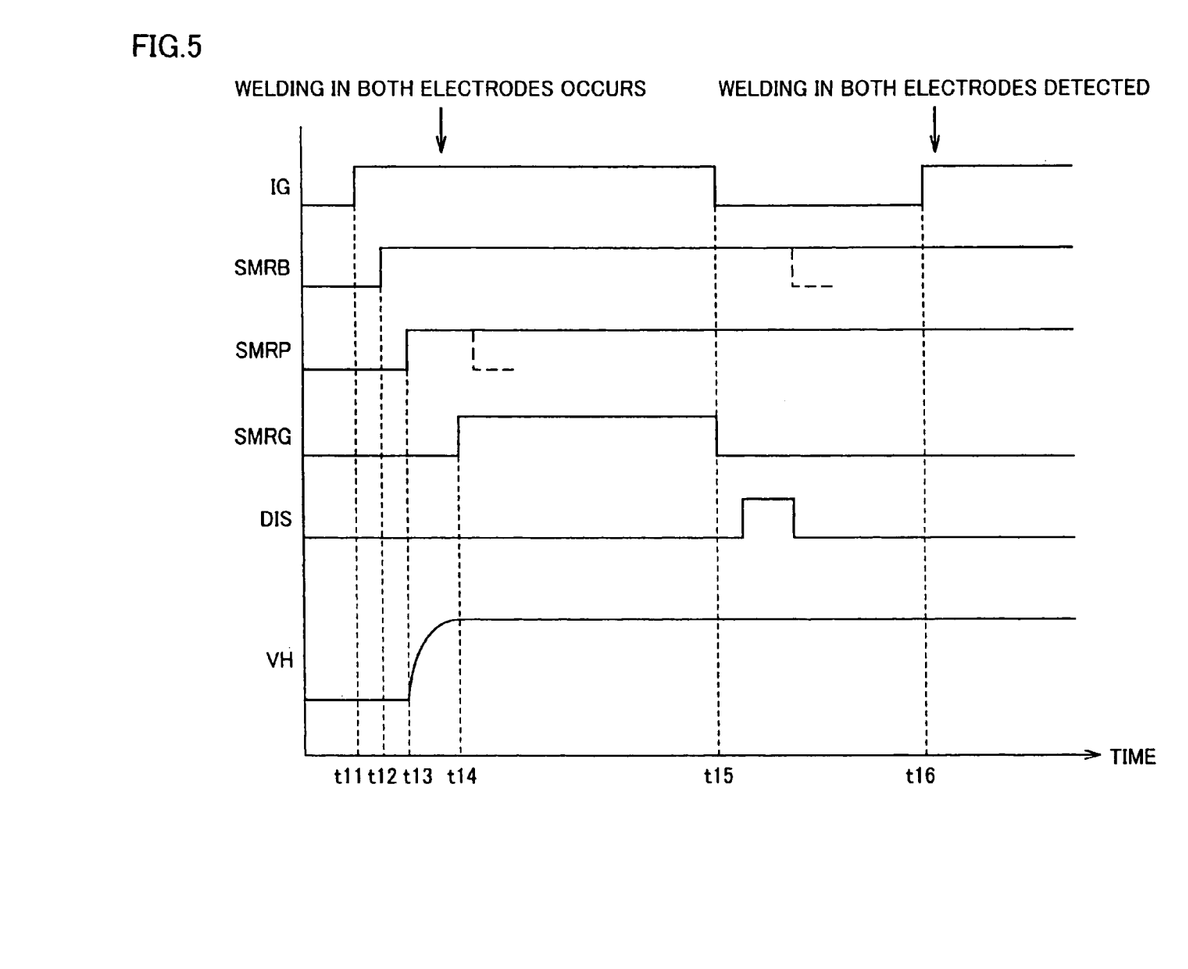
FIG. 5 is another timing chart illustrating operations of the system main relay shown in FIG. 1.

FIG. 5 is another timing chart illustrating operations of system main relays SMRB, SMRP, SMRG shown in FIG. 1. It should be noted that FIG. 5 shows a timing chart in the case where system main relays SMRB, SMRP are both welded.

Referring to FIG. 5, when signal IG is activated at time t11, control device 30 confirms that voltage VH is lower than the predetermined value, turns on system main relay SMRB at time t12, and turns on system main relay SMRP at time t13. Accordingly, capacitors 11, 13 are precharged via limiting resistor Rp, resulting in increase of voltage VH. In this case, it is regarded that system main relays SMRB, SMRP are welded, but on this occasion, control device 30 has not detected the welding of system main relays SMRB, SMRP yet.

Control device 30 turns on system main relay SMRG at time t14, and deactivates signal SEP at time t5 to turn off system main relay SMRP. However, since system main relay SMRP is welded, system main relay SMRP does not become off. When signal IG is deactivated at time t15, control device 30 turns off system main relay SMRG. Thereafter, control device 30 deactivates signal SEB to turn off system main relay SMRB. However, since system main relay SMRB is welded, system main relay SMRB does not become off.

Then, at time t16, signal IG is activated again. On this occasion, voltage VH never decreases since system main relays SMRB, SMRP are welded. Control device 30 detects that voltage VH is equal to or greater than predetermined value Vth1, thereby detecting that system main relays SMRB, SMRP are both welded. Then, control device 30 generates the welding occurrence flag and outputs it to the storage unit in order to prohibit the subsequent discharging process.

In addition, when the welding of system main relays SMRB, SMRP are detected, control device 30 notifies the user that the welding has been detected.

If the ignition key is turned on/off repeatedly with system main relays SMRB, SMRP being both welded, current would repeatedly flow in limiting resistor Rp to excessively heat limiting resistor Rp; however, in the first embodiment, when it is determined that system main relays SMRB, SMRP are welded, the subsequent discharging process is prohibited as described above. Thus, according to the first embodiment, limiting resistor Rp can be prevented from being excessively heated and broken.

Second Embodiment

As with the case where system main relays SMRB, SMRP are both welded, limiting resistor Rp may be excessively heated and broken when system main relays SMRB, SMRP cannot be turned off due to jamming of system main relays SMRB, SMRP resulting from collision of the vehicle and the discharging process are performed repeatedly. In view of this, in a second embodiment, the discharging process is also prohibited when collision of the vehicle is detected.

Figure 6:
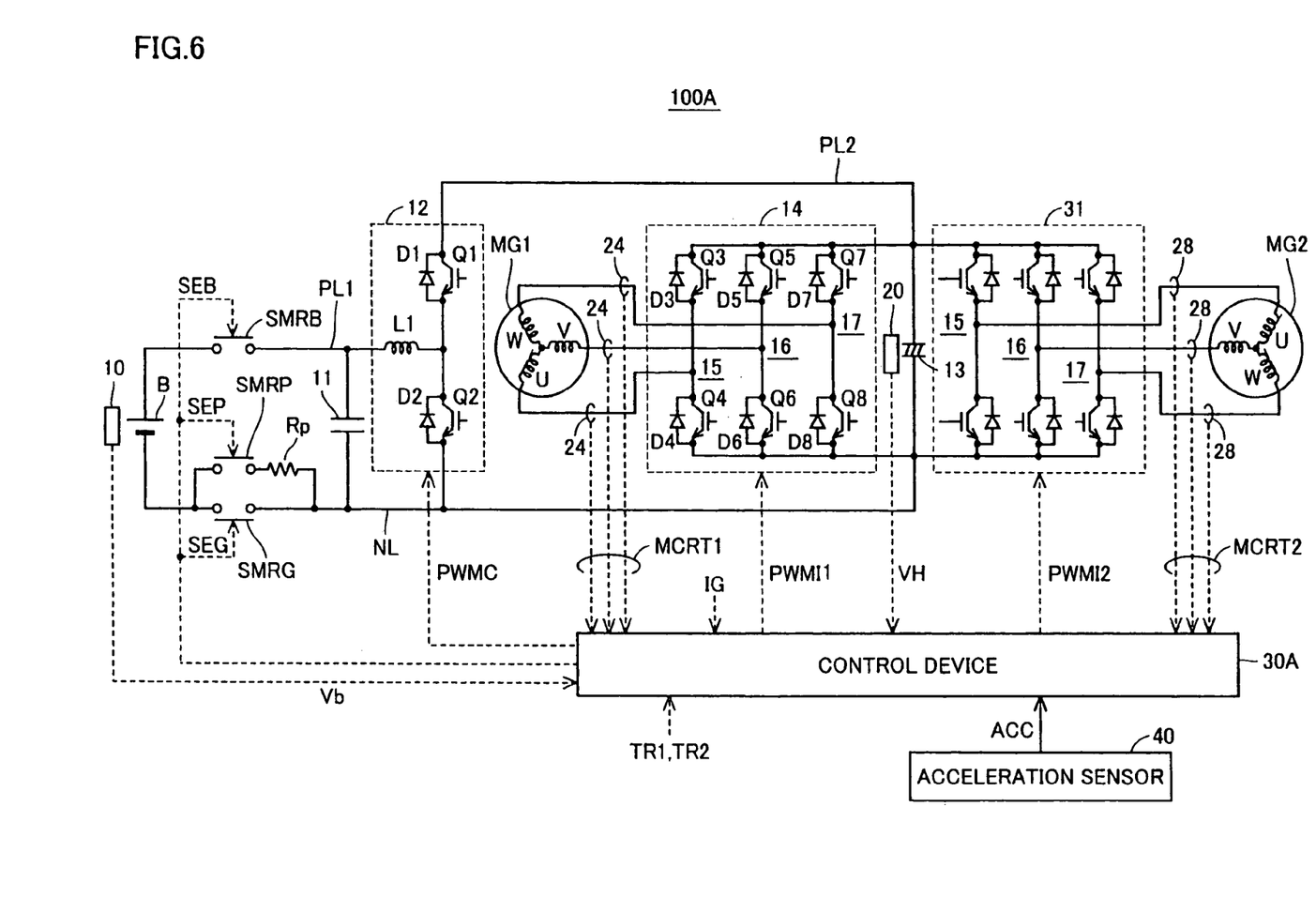
FIG. 6 is a schematic block diagram of a motor drive device including a power supply control device according to a second embodiment.

FIG. 6 is a schematic block diagram of a motor drive device including a power supply control device according to the second embodiment. Referring to FIG. 6, motor drive device 100A includes an acceleration sensor 40 in addition to the configurations of motor drive device 100 according to the first embodiment shown in FIG. 1, and includes a control device 30A instead of control device 30.

Acceleration sensor 40 detects acceleration ACC generated in the vehicle, and outputs the detected value thereof to control device 30A. Control device 30A determines whether or not collision of the vehicle occurs, based on the detected value of acceleration ACC sent from acceleration sensor 40. Specifically, control device 30A determines that collision has occurred, when acceleration ACC exceeds a predetermined value.

It should be noted that the other functions of control device 30A are the same as those of control device 30 shown in FIG. 1. Note also that the other configurations of motor drive device 100A are the same as those of motor drive device 100 shown in FIG. 1.

Figure 7:
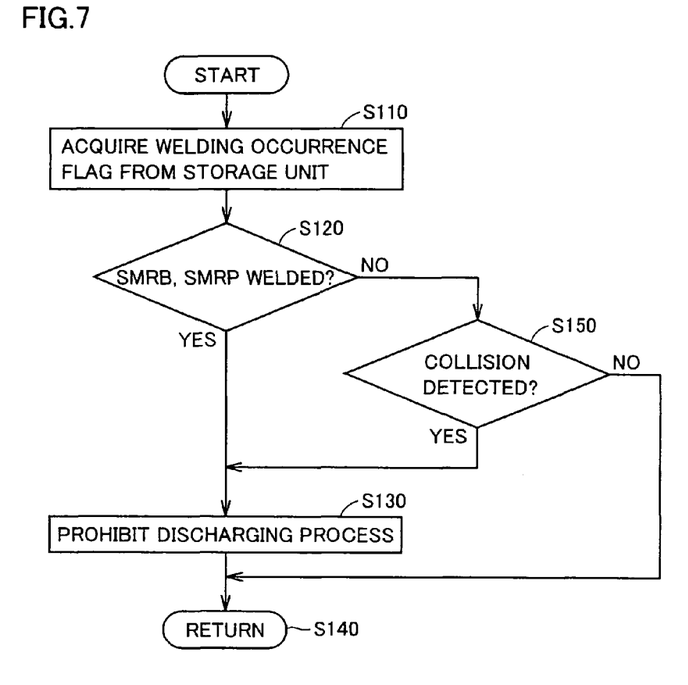
FIG. 7 is a flowchart illustrating a process performed by the control device shown in FIG. 6 to prohibit a discharging process.

FIG. 7 is a flowchart illustrating a process performed by control device 30A shown in FIG. 6 to prohibit the discharging process. It should be noted that the process in the flowchart is also called from the main routine and executed whenever a fixed period of time passes or a predetermined condition is satisfied. Note also that the process to determine whether or not system main relays SMRB, SMRP are welded in the second embodiment is the same as the process of determination as to the welding in the first embodiment shown in FIG. 2.

Referring to FIG. 7, the flowchart therein includes a step S150 in addition to those of the flowchart shown in FIG. 3. Specifically, if it is determined in step S120 that system main relays SMRB, SMRP are not welded (NO in step S120), control device 30A detects whether or not collision of the vehicle has occurred, based on acceleration ACC detected by acceleration sensor 40 (step S150). If collision of the vehicle has been detected (YES in step S150), control device 30A transfers the process to step S130 to prohibit execution of the subsequent discharging process. On the other hand, if collision of the vehicle has not been detected in step S150 (NO in step S150), control device 30A transfers the process to step S140.

As described above, in the second embodiment, when collision of the vehicle is detected, the subsequent discharging process is prohibited. Hence, according to the second embodiment, limiting resistor Rp can be prevented from being excessively heated and broken when system main relays SMRB, SMRP are both jammed due to collision of the vehicle.

In each of the first and second embodiments, system main relay SMRP and limiting resistor Rp are connected to system main relay SMRG of the negative electrode side in parallel, but system main relay SMRP and limiting resistor Rp may be connected to system main relay SMRB of the positive electrode side in parallel. In this case, the discharging process may be prohibited when it is detected that system main relays SMRP, SMRG are both welded.

Further, in the description above, boost converter 12 is provided between system main relays SMRB, SMRG, SMRP and inverters 14, 31, but the present invention is applicable to a motor drive device provided with no boost converter 12.

Furthermore, in the description above, the discharging process is performed using motor generators MG1, MG2, but the discharging process may be also performed further using a motor generator MGR, which drives a driving wheel (for example, rear wheel) different from the driving wheel (for example, front wheel) driven by motor generator MG2 and is included in a system that also includes an inverter for driving motor generator MGR. It should be noted that the present invention provides a greater advantage when applied to a system in which a discharging rate is greater in the discharging process, since as the discharging rate is greater in the discharging process, greater current can flow in limiting resistor Rp with system main relays SMRB, SMRP being both welded.

It should be noted that, in the description above, the control performed by each of control devices 30, 30A is actually performed by a CPU (Central Processing Unit). The CPU reads out from a ROM (Read Only Memory) a program including each of the steps in the flowcharts shown in FIGS. 2, 3, 7, and executes the program thus read out, thereby executing the process in accordance with the flowcharts shown in FIGS. 2, 3, 7. Hence, the ROM corresponds to a computer (CPU) readable storage medium storing the program including each of the steps in the flowcharts shown in FIGS. 2, 3, 7.

It should be also noted that, in the description above, system main relays SMRB, SMRG, SMRP respectively correspond to a "first relay", a "second relay", and a "third relay" in the present invention, and limiting resistor Rp corresponds to a "resistive element" in the present invention. In addition, system main relays SMRB, SMRG, SMRP may respectively correspond to "second relay", "first relay", and "third relay" in the present invention. Further, capacitor 13 corresponds to a "charge unit" in the present invention, and motor generators MG1, MG2 form a "discharging device" in the present invention.

It should be considered that the embodiments disclosed herein are illustrative and non-restrictive in any respect. The scope of the present invention is defined by the scope of claims rather than the embodiments described above, and is intended to include any modifications within the scope and meaning equivalent to the terms of the claims.

The invention claimed is:

1. A power supply control device mounted on a vehicle, comprising:
    a first relay connected to one electrode of a direct-current power supply;
    a second relay connected to the other electrode of said direct-current power supply;
    a third relay and a resistive element connected in series and connected to said second relay in parallel;
    a discharging device configured to be able to discharge a charge unit connected between a first power line electrically connected to said first relay and a second power line electrically connected to a circuit including said second relay as well as said third relay and said resistive element connected in series; and
    a control device prohibiting said discharging device from discharging said charge unit when said first and third relays are determined to be welded.

2. The power supply control device according to claim 1, wherein said control device outputs a command to said discharging device to instruct discharging of said charge unit when said charge unit has a voltage exceeding a first predetermined value after start of a system of said vehicle, and said control device determines that said first and third relays are welded when said voltage exceeds a second predetermined value thereafter.

3. The power supply control device according to claim 1, wherein said control device also prohibits said discharging device from discharging said charge unit when collision of said vehicle is detected.

4. A method for controlling a power supply device mounted on a vehicle,
    said power supply device comprising:
    a direct-current power supply;
    a first relay connected to one electrode of said direct-current power supply;
    a second relay connected to the other electrode of said direct-current power supply;
    a third relay and a resistive element connected in series and connected to said second relay in parallel; and
    a discharging device configured to be able to discharge a charge unit connected between a first power line electrically connected to said first relay and a second power line electrically connected to a circuit including said second relay as well as said third relay and said resistive element connected in series,
    aid method comprising the steps of:
    determining whether or not said first and third relays are welded; and
    prohibiting said discharging device from discharging said charge unit when said first and third relays are determined to be welded.

5. The method according to claim 4, wherein said step of determining includes the steps of:
    instructing discharging of said charge unit when said charge unit has a voltage exceeding a first predetermined value after start of a system of said vehicle; and
    determining that said first and third relays are welded when said voltage exceeds a second predetermined value even after instructing said discharging.

6. A computer-readable storage medium storing a program for causing a computer to perform the method according to claim 5.

7. The method according to claim 4, further comprising the step of determining whether or not collision of said vehicle is detected, wherein
    when the collision of said vehicle is detected, said discharging device is prohibited from discharging said charge unit in said step of prohibiting discharging.

8. A computer-readable storage medium storing a program for causing a computer to perform the method according to claim 7.

9. A computer-readable storage medium storing a program for causing a computer to perform the method according to claim 4.

* * * * *